United States Patent [19]

Parker et al.

[11] 3,862,315

[45] Jan. 21, 1975

[54] TETRAAMIDINO DERIVATIVES OF ANTIBIOTIC EM-49

[75] Inventors: William Lawrence Parker, Pennington; Edward Meyers, East Brunswick, both of N.J.

[73] Assignee: E. R. Squibb & Sons, Inc., Princeton, N.J.

[22] Filed: Nov. 20, 1972

[21] Appl. No.: 307,885

[52] U.S. Cl. ................................................ 424/118
[51] Int. Cl. ........................................... A61k 21/00
[58] Field of Search ........................ 424/118; 195/80

[56] References Cited
OTHER PUBLICATIONS

Miller, The Pfizer Handbook of Microbial Metabolites, 1961, McGraw Hill Book Co., Inc., N.Y., N.Y., p. 371.

*Primary Examiner*—Jerome D. Goldberg
*Attorney, Agent, or Firm*—Lawrence S. Levinson; Merle J. Smith

[57] ABSTRACT

Antibiotic EM-49, an antimicrobially active material obtained from the microorganism *Bacillus circulans* ATCC 21656, may be chemically treated to amidinate the free amino groups, thereby obtaining the tetraamidino derivative which is effective against a variety of bacteria and fungi.

2 Claims, 1 Drawing Figure

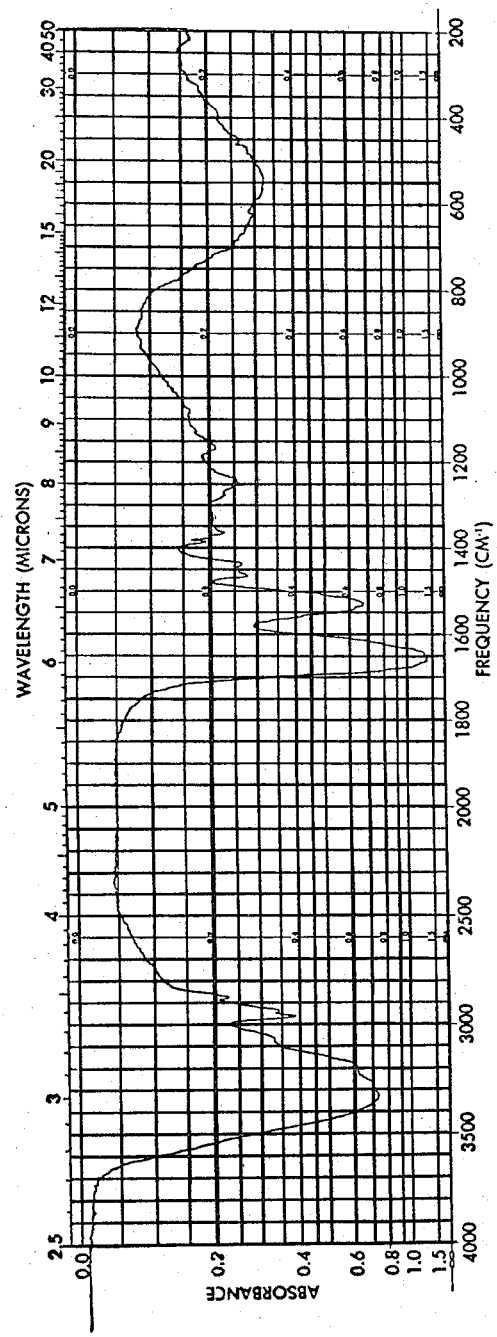

TETRAAMIDINO DERIVATIVES OF ANTIBIOTIC EM-49

SUMMARY OF THE INVENTION

Antibiotic EM-49, obtained from the microorganism *Bacillus circulans* ATCC 21656, is an antimicrobially active material which has been described in the copending application of Sawao Murao, Edward Meyers and William Lawrence Parker, Ser. No. 242,047, filed Apr. 7, 1972. This antibiotic may be separated into component parts comprising closely related octapeptide antibiotics as described in that application.

It has now been found that the antibiotic EM-49, described in the foregoing application, has free amino groups which may be amidinated, e.g., by treatment with 1-amidino-3,5-dimethylpyrazole nitrate in an aqueous alcohol like methanol, to obtain the tetraamidino derivative of antibiotic EM-49.

This invention therefore relates to the tetraamidino derivative of antibiotic EM-49 and to the method for its production.

The FIGURE shows the infrared spectrum of the tetraamidino derivative of antibiotic EM-49, as the hydrochloride, in KBr.

DETAILED DESCRIPTION OF THE INVENTION

Antibiotic EM-49 is a new antibiotic produced by the cultivation under controlled conditions of the microorganism *Bacillus circulans* ATCC 21656 as described in the copending application of Murao et al. referred to above. Briefly, the production of antibiotic EM-49 involves cultivating the microorganism *Bacillus circulans* ATCC 21656 in an aqueous nutrient medium comprising an assimilable carbohydrate and an assimilable nitrogen source under submerged aerobic conditions until substantial antibiotic activity is imparted to the medium.

The fermentation broth is acidified, the solids are separated by filtration, washed with water and the water washings are added to the filtrate. The combined washings and filtrate are extracted with a water immiscible alcohol, preferably n-butanol. The alcoholic solution is concentrated and the antibiotic is precipitated with an organic solvent, e.g., ethyl acetate, acetonitrile, ether or preferably with acetone. The product may be further purified by counter-current distribution in a water-alcohol-organic acid system, e.g., n-propanol-n-butanol-water-acetic acid or by formation of the helianthate salt and regeneration of the antibiotic from this salt.

These procedures result in the isolation of the product, antibiotic EM-49, as the acid salt corresponding to the acid used for acidification of the broth. The salt may be converted to the free base by neutralization with a base like ammonium hydroxide, sodium hydroxide, barium hydroxide, or the like, and extraction with a water immiscible alcohol like n-butanol.

The antibiotic EM-49, obtained in this manner is an antimicrobially active substance which may be separated by ion exchange chromatography into four fractions containing active materials closely related structurally. These closely related, octapeptide antibiotics, each having four free amino groups and reacting in the same way to amidination, are referred to herein as antibiotic EM-49 and, unless specifically indicated otherwise, the term is intended to refer to the antibiotic and its individual components.

Antibiotic EM-49 and its components are active against fungi and bacteria such as *Staphylococcus aureus*, *Streptococcus pyogenes*, *Escherichia coli*, *Pseudomonas aeruginosa* and *Candida albicans*.

The four free amino groups present in antibiotic EM-49 are amidinated by treatment with an amidinating agent to obtain the tetraamidino derivative of antibiotic EM-49. This tetraamidino derivative is produced by treating antibiotic EM-49, preferably in the form of one of its soluble salts like the hydrochloride, hydrobromide, hydroiodide, acetate, nitrate, oxalate, methanesulfonate, succinate, tartrate, borate, etc., with an amidinating agent like 1-amidino-3,5-pyrazole nitrate, which is preferred, O-methylisourea, S-methylisothiourea, or the like in a buffered inert solvent, e.g., an aqueous alcoholic solution. The alcohol is preferably methanol, but ethanol, propanol or the like may also be used. Other water-miscible organic solvents, e.g., tetrahydrofuran, acetone, etc. are also suitable.

It is desirable to use four moles or more (e.g., up to about 8 moles) of amidinating agent per mole of antibiotic EM-49.

Alternatively, antibiotic EM-49, in a buffered inert solvent, may be treated with chloroformamidinium chloride or urea phosphoryl chloride adduct.

The amidination reaction is effected within a broad temperature range, e.g., about 5° to about 60°C., preferably at room temperature. The pH is adjusted within the range of about 8.5 to 10.5, for example by the use of an organic base such as triethylamine, trimethylamine, N-methylmorpholine or the like.

The product may then be isolated, e.g., by solvent extraction from an acidic aqueous solution, for example, with a water-immiscible alcohol like butanol, pentanol or the like, and concentration, followed by precipitation with an organic solvent like ethyl acetate, ether, acetonitrile, acetone or the like. The tetraamidino derivative of EM-49 is obtained as a result of the amidination of the four free γ-amino groups in the 2,4-diaminobutyric acid residues present in antibiotic.

Since it is desirable to use as the starting material a salt of antibiotic EM-49 which is soluble or suspendible in aqueous solution, EM-49 hydrochloride is the preferred starting material. The product is best isolated from an aqueous acidic solution and, being strongly basic, is obtained in the form of its salt. The preferred salt is the hydrochloride.

By dissolving this product in water and passing the solution through an ion exchange resin having the desired salt anion, other salts such as the nitrate, hydrobromide, hydroiodide, acetate, tartrate, borate, succinate, etc., are obtained.

The tetraamidino derivative of antibiotic EM-49 and its salts are active against fungi and gram-negative and gram-positive bacteria, e.g., *Staphylococcus aureus*, *Staphylococcus epidermidis*, *Streptococcus pyogenes*, *Corynebacterium minutissimum*, *Escherichia coli*, *Pseudomonas aeruginosa*, *Candida albicans*, *Trichophyton mentagrophytes* and *Trichomonas vaginalis*. The tetraamidino derivative of antibiotic EM-49 or a physiologically acceptable salt thereof may therefore be used as an antimicrobial agent either as an environmental disinfectant or sterilizing medium, e.g., in a spray, solution or dust containing up to about 1 percent of the substance in a conventional carrier, or to combat infections in various animal species due to microorganisms such as those enumerated, e.g., topically in a conventional cream or ointment containing up to about 1 percent of the substance. For example, a topical composition containing ½ to 1 percent of the active substance in a cream base protects against *Staphylococcus aureus* infection in mice.

The following examples are illustrative of the invention. Temperatures are on the centigrade scale.

EXAMPLE 1

Antibiotic EM-49 is prepared as described in the copending application referred to above.

a. Yeast beef agar slants are seeded with *Bacillus circulans* ATCC 21656 (a culture of which is on deposit and available from the American Type Culture Collection, Rockville, Md.). They are incubated overnight at 37°C. and then used to inoculate 50 ml. of an aqueous soybean meal medium contained in 250 ml. Erlenmeyer flasks. The composition of the germination medium is:

| Medium | Grams |
| --- | --- |
| Soybean meal | 15.0 |
| Dehydrated mashed potato | 15.0 |
| Glucose | 50.0 |
| $CoCl_2.2H_2O$ | 0.005 |
| $CaCO_3$ | 10.0 |
| Distilled water to | 1 liter |

This medium is sterilized for 30 minutes at 121°C and at 15 lbs. steam pressure prior to use. The inoculated germination flasks are incubated at 25°C for 72 hours on a rotary shaker, operating at 280 r.p.m. with a 2 inch throw.

A 2.5 percent (v/v) transfer is made from the germination flask to 500 ml. Erlenmeyer flasks containing 100 ml. of an aqueous corn steep liquor medium. The composition of this medium is:

| Medium | Grams |
| --- | --- |
| Corn steep liquor | 6.0 |
| $(NH_4)H_2PO_4$ | 3.0 |
| Yeast extract | 2.5 |
| Dextrose | 10.0 |
| Distilled water to | 1 liter |
| Adjust pH to 7.0 | |
| $CaCO_3$ | 2.5 |

The fermentation flasks are incubated and agitated as are the germination flasks. Samples are taken at 3 and 6 days, and examined by paper chromatography and bioassay. For paper chromatography suitable amounts of a butanol extract of the acidified beer are spotted on sheets of Whatman No. 1 paper and the chromatograms developed with a solvent of the following composition: n-butanol, acetic acid, water (4:1:5, by volume). The upper phase of this solvent system is utilized as the solvent. In this system, EM-49 (as the hydrochloride) has an $R_f$ value of 0.71. The antibiotic is detected by bioautography against *Staphylococcus aureus* FDA 209P and *Escherichia coli* ATCC 10536. For bioassay, both organisms are used in conventional tube dilution assays.

b. A 250 liter batch of *Bacillus circulans* ATCC 21656 is fermented in a 100 gal. stainless steel vessel with the medium and operating conditions described below:

Stage 1

Inoculum: Culture of *Bacillus circulans* ATCC 21656 is preserved by storage in liquid nitrogen, and grown out when needed on yeast beef agar slants that have the following composition:

| Medium | Grams |
| --- | --- |
| Beef extract | 1.5 |
| Yeast extract | 3.0 |
| Peptone | 6.0 |
| Dextrose | 1.0 |
| Agar | 15.0 |
| Distilled water to 1,000 ml. | |

The medium is sterilized at 15 lbs. pressure and at 121°C for 15 minutes prior to use.

Growth from the slant is used to inoculate the first germinator flasks.

| Medium | Grams |
| --- | --- |
| Soybean meal | 15.0 |
| Dehydrated mashed potato | 15.0 |
| Glucose | 50.0 |
| $CoCl_2.2H_2O$ | 0.005 |
| $CaCO_3$ | 10.0 |
| Distilled water to | 1000 ml. |
| Sterilize at 121°C for thirty minutes | |

100 ml. of this medium in a 500 ml. Erlenmeyer flask is incubated 72 hours on a rotary shaker at 25°C. The shaker operates at 280 r.p.m. with a 2 inch throw.

Stage 2

Inoculum: 100 ml. from first stage.

Medium: Same as the germinator medium of stage 1. The inoculum and 1,000 ml. of medium in a 4,000 ml. Erlenmeyer flask is incubated 72 hours at 25°C. on a rotary shaker. The shaker is operated at 280 r.p.m. with a 2 inch throw.

Stage 3

Inoculum: 3,000 ml. from stage 2.
Medium:

| Medium | Grams |
| --- | --- |
| Corn steep liquor | 6.0 |
| $(NH_4)H_2PO_4$ | 3.0 |
| Yeast Extract | 2.5 |
| Dextrose | 10.0 |
| Distilled water to 1,000 ml. | |
| Adjust to pH 7.0 | |
| $CaCO_3$ | 2.5 |

The inoculum is added to 250 liters of medium and incubated 144 hours. During incubation, the broth is aerated at the rate of 2.0 foot per minute superficial air velocity, at 10 p.s.i. During this period, the broth is agitated at the rate of 0.4 watt per liter and at 155 r.p.m.

c. The fermentation broth, obtained as described in part b (209 liters), is adjusted to pH 2.0 with 1.5 liters of concentrated hydrochloric acid. Filter aid (Hyflo, 15 kg.) is added to the acidified beer and the mixture filtered to give 41 kg. of insoluble material. The insoluble cake is washed with 10 liters of water and the washings combined with the filtrate to give 190 liters. The washed cake (41 kg.) is discarded.

d. The filtrate (190 liters) obtained in part c is extracted three times with 56 liter portions of water saturated n-butanol. The butanol layers (194 liters) are pooled and concentrated in vacuo, at a temperature less than 45°C., to a small volume (2.3 liters).

e. A 50 ml. portion of the concentrate obtained in part d is diluted with 750 ml. of acetone and the resulting precipitate is centrifuged. The precipitate is washed with acetone (60 ml.) by suspending it in the solvent and then centrifuging it. This is repeated using ethyl acetate (three 60-ml portions) and finally ether (three 60-ml portions). The precipitate is dried in air, powdered and dried in vacuo, giving 1.4 g. of a light-tan powder.

f. A 1.4 g. sample of the acetone-insoluble powder obtained in part e is further purified by counter-current distribution using a n-propanol-n-butanol-water-acetic acid (50:75:100:2 by volume) system. Twenty-nine transfers are made using 40 ml. of each phase per tube. The maximum activity, as determined by paper disc agar diffusion assay, is in tube 11. The contents of tubes 8-14 are combined and the solvents are removed in vacuo. The residue is dissolved in a little methanol and the antibiotic is precipitated by the addition of acetone and ether. The precipitate is washed well with ether, dried in air and then in vacuo, giving 0.466 g. of a light-tan powder. This material is primarily the basic peptide antibiotic EM-49, in the form of its hydrochloride salt.

g. The hydrochloride of antibiotic EM-49 is converted to the free base by counter-current distribution using a n-butanol-0.5 N $NH_4OH$ system. 1.01 g. of the hydrochloride of EM-49, prepared as in part f is processes in a 29 transfer counter-current distribution using 40 ml. each of upper and lower phases per tube. The contents of tubes 25-29 are combined, and the upper phase is separated and taken to dryness in vacuo. The residue is then dissolved in warm methanol (ca 50 ml.). Ethyl acetate (50 ml.), benzene (50 ml.) and cyclohexane (50 ml.) are added. Removal of this solvent mixture in vacuo gives 0.75 g. of a nearly white powder that is the free base of the antibiotic EM-49. This material melts at 245°-248°C. in an evacuated capillary. Analysis: C, 56.64; H, 8.65; N, 16.50; Cl, 0.0 h. 1.00 g. of the acetone-insoluble powder obtained as described in part e is dissolved as much as possible in 10 ml. of water. The insoluble material is removed by centrifugation, washed with 10 ml. of water and then the supernatants are combined.

1.00 g. of methyl orange is suspended in 15 ml. of water. 5 ml. of dimethylformamide are added and the mixture is warmed until the methyl orange just dissolves. This warm solution is added to the EM-49 solution. The mixture is cooled to room temperature and the solid is isolated by centrifugation, washed with 3 × 35 ml. of water and dried in vacuo.

The crude helianthate is dissolved as much as possible in 3 ml. of dimethylformamide and the insoluble material is removed by centrifugation, washing it with 2 × 3 ml. of dimethylformamide. The combined dimethylformamide solution is combined with 90 ml. of water, the precipitate is separated by centrifugation and this is washed with 3 × 30 ml of water.

The helianthate of EM-49 is amorphous but is purified by reprecipitation from methanol-acetonitrile (2:1). This material is dried at 0.02 mm. and 100° for 18 hours and then allowed to equilibrate with atmospheric moisture. M.P. (Kofler hot stage): 242°-4°C. (dec.).

Analysis: Found: C, 53.01; H, 6.74; N, 14.19; S, 5.44 (water 5.05%). For a molecular weight of 2238, the elemental analysis corresponds to an empirical formula $C_{104}H_{144}N_{24}O_{24}S_4$.

The EM-49 helianthate is converted to the hydrochloride by stirring with 10 ml. of 0.36N hydrochloric acid for 20 minutes. The insoluble material is removed by centrifugation and washed with 2 × 5 ml. 0.36 N hydrochloric acid. The combined supernatant is then stirred with 320 mg. of Darco G-60 charcoal and filtered through diatomaceous earth, giving a nearly colorless solution.

The filtrate is extracted with two 10-ml. portions of n-butanol. Removal of the butanol in vacuo gives an amorphous solid. This is converted to a fine powder by dissolving the solid in a small quantity of methanol, adding ethyl acetate until the antibiotic precipitates, and then removing the solvent mixture in vacuo. The powder is then dried at 50° and 0.02 mm. for several (e.g. 5) hours and then equilibrated with atmospheric moisture overnight.

Example 2 a. A solution of 5.0 g. of antibiotic EM-49 tetrahydrochloride (obtained in Example 1h) and 6.67 g. of 1-amidino-3,5-dimethylpyrazole nitrate in 100 ml. of water and 100 ml. of methanol is adjusted to pH 9.5 with triethylamine (ca. 8.8 ml.). The solution is left at room temperature for 10 days and is then concentrated in vacuo (adding n-butanol as necessary to reduce foaming). The residue is dissolved in a mixture of 50 ml. of 1 N hydrochloric acid and 50 ml. of n-butanol. The phases are separated and the aqueous phase is extracted with another 50 ml. of n-butanol. The combined butanol extract is washed with three 50 ml. portions of 0.36 N hydrochloric acid and is then concentrated in vacuo. The residue is dissolved in methanol and precipitated by the addition of ethyl acetate. Removal of the solvents in vacuo gives 5.4 g. of powder.

b. A solution of 5.3 g. of this powder in 50 ml. of water is passed through a bed of 25 ml. of Dowex 21K ion-exchange resin ($Cl^-$ form), washing the resin with water until no $Cl^-$ can be detected in the effluent. Concentration of the combined effluent gives a residue that is dissolved in methanol and then precipitated by the addition of ethyl acetate. The solvents are removed and the product is dried in vacuo. The product is finely powdered with a mortar and pestle and then equilibrated with atmospheric moisture to give 5.1 g. of tetraamidino EM-49 tetrahydrochloride. The material sinters at ca. 170°, coalesces (but does not flow) at 195°-206° and decomposes (bubbles) at ca. 260°C.

Analysis: Calcd. for $C_{55}H_{95}N_{21}O_{12}Cl_4$: C, 47.72; H, 6.92; N, 21.25; Cl, 10.25; O, 13.87:

Found: C, 43.91; H, 7.63; N, 19.91; O (by difference) 18.74; Cl, 9.81; water, 7.75%. Adjusted to correspond to the anhydrous material: C, 47.60; H, 7.34; N, 21.58; O, 12.85; Cl, 10.63.

This product has an approximate molecular weight of 1384 and specific rotation $[\alpha]^{25.5}$ D-27.7 (c 1.0, $H_2O$). It is soluble in water, methanol, ethanol, dimethylformamide and dimethylsulfoxide. It is insoluble in chloroform, acetone, ethyl acetate and ether. In paper chromatography on Whatman No. 1 paper, eluting with n-butanol-concentrated ammonium hydroxide-water (9:1:2), the product moves with an $R_f$ of 0.23 in comparison with antibiotic EM-49 hydrochloride which has an $R_f$ of 0.86.

EXAMPLE 3

The same product as in Example 2 is obtained by substituting O-methylisourea for the 1-amidino-3,5-dimethylpyrazole nitrate and adjusting the pH to 11 in part a.

By using the same ion exchange resin Br⁻ form, the tetrahydrobromide is obtained.

EXAMPLE 4

The same product as in Example 2 is obtained by substituting S-methylisothiourea for the 1-amidino-3,5-dimethylpyrazole nitrate in part a.

What is claimed is:

1. The tetraamidino derivative of antibiotic EM-49 or acid salts thereof, the hydrochloride having the infrared absorption spectrum as in the FIGURE, the approximate elemental analysis of anhydrous material: C, 47.60; H, 7.34; N, 21.58; Cl, 10.63; the approximate empirical formula: $C_{55}H_{95}N_{21}O_{12}Cl_4$ and an approximate molecular weight of 1384.

2. The tetrahydrochloride of the product of claim 1.

* * * * *